Dec. 26, 1967         R. McILROY         3,359,721
PUMP MEANS IN AN INTERNAL COMBUSTION ENGINE
Filed Jan. 24, 1966                    2 Sheets-Sheet 1

ROBERT MC ILROY
INVENTOR

BY John R. Faulkner
Robert E. McCollum

ATTORNEYS

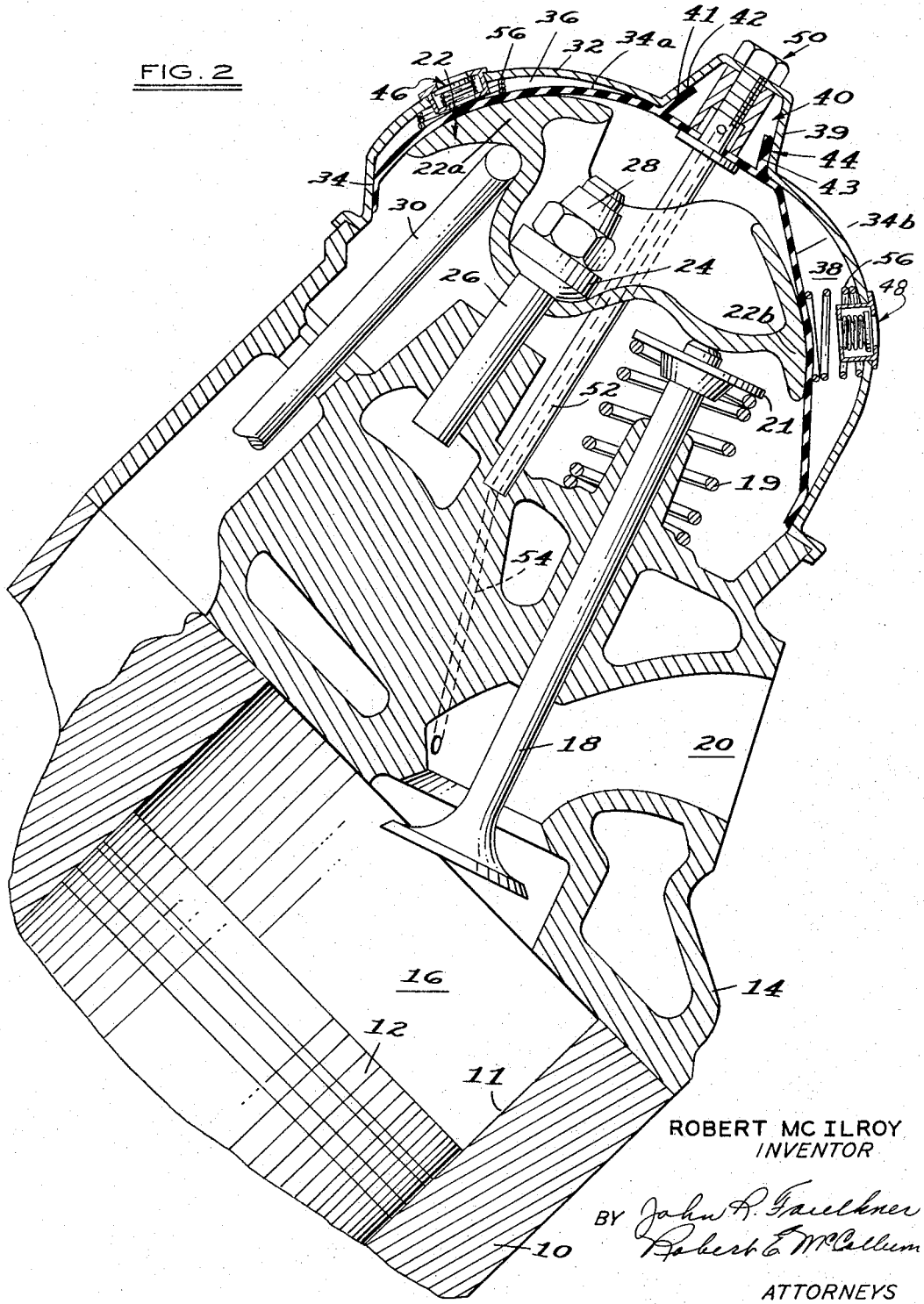

3,359,721
PUMP MEANS IN AN INTERNAL COMBUSTION ENGINE
Robert McIlroy, Dearborn, Mich., assignor to Ford Motor Company, Dearborn, Mich., a corporation of Delaware
Filed Jan. 24, 1966, Ser. No. 522,429
10 Claims. (Cl. 60—30)

ABSTRACT OF THE DISCLOSURE

Two pump chambers are formed above a rocker arm by positioning a diaphragm adjacent the inner surface of the engine valve cover so a complete pump chamber exists above each end of the rocker arm. A reservoir is formed in the valve cover between the chambers and flap valves on the diaphragm permit air flow from the chambers into the reservoir. The bolt holding the valve cover on the cylinder head passes through the reservoir and contains a passage communicating with another passage in the engine head to conduct air to the combustion chamber exhaust port. When the chambers are located above the rocker arm for the exhaust valve, the air pumped to the exhaust port is automatically timed to mix with the exhaust gases containing the highest proportions of unburned hydrocarbons.

---

Figure 1:
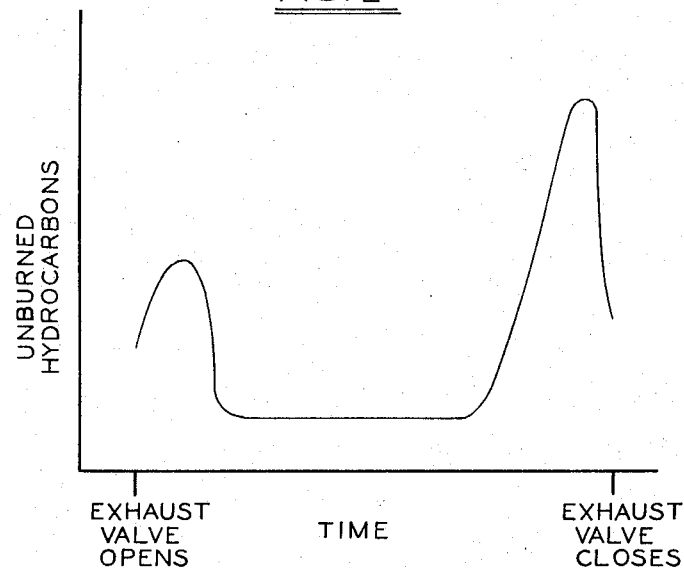

This invention pertains to internal combustion engines having pump means therein and particularly concerns an engine using the pump means to reduce the quantity of the smog producing and other harmful materials in the exhaust gases.

Unburned hydrocarbons in engine exhaust gases are catalyzed by sunlight to form smog which irritates eyes and respiratory systems of humans and harms vegetation. Under most operating conditions, the proportion of unburned hydrocarbon in gases exhausting from combustion chambers is greatest at the beginning and the end of the exhaust stroke. Gases exhausting from the cylinder throughout the entire exhaust stroke contain small amounts of carbon monoxide. Mixing air with the hot exhaust gases spontaneously oxidizes the hydrocarbons and the carbon monoxide if the temperature of the mixture is maintained above about 1200° F., the spontaneous ignition temperature. Once oxidation starts, the heat of combustion produced thereby aids in maintaining the mixture temperature above this minimum.

Belt driven air pumps have been used widely to supply air to the exhaust passages for oxidation. These pumps are necessarily mounted near the front of the engine and a considerable length of tubing is required to transmit the air to the exhaust passages. Furthermore, air is supplied continuously by these pumps even though the varying amounts necessary for efficient oxidation are useful only while the exhaust gases are in the exhaust passages. Cooling caused by excess air reduces the efficiency of the oxidation process and can prevent its occurrence by reducing the mixture temperature below the spontaneous ignition temperature. Devices limiting the air supplied to the exhaust passages by the belt driven pumps increase material costs and assembly time.

The engine of this invention has a combustion chamber valve with rocker arm means imparting operating motion thereto. A pump chamber means is actuated by each end of the rocker arm means. Inlet means admit fluid to each pump chamber and outlet means provide an exit for the fluid. The combustion chamber valve can be mounted in an engine head member with a cover means mounted on the head member and a diaphragm means cooperating with the cover means to form pump chambers adjacent each end of the rocker arm means.

Fluid pumped from the pump chambers can be used for numerous purposes. For example, when the fluid is air, it can be used in the engine induction system, in engine locations where cooling or heating is desired, or in the combustion chamber exhaust passages to oxidize harmful substances in the exhaust gases.

One of the most significant advantages of the engine of this invention is the lack of external drive mechanisms for the pump means. When air from the pump means is used to oxidize undesirable materials in the exhaust gases, other advantages of the engine include the location of the pump means near the combustion chamber exhaust passages, the use of bores in engine parts to transmit air to the exhaust passages, the ease with which air can be supplied at the beginning and end of the exhaust stroke to oxidize the high proportions of undesirable substances, and the reduction in the amount of excess air.

By associating the diaphragm means with the exhaust valve rocker arm, air from the pump chambers is automatically timed to mix with the hot exhaust gases having the maximum proportions of unburned hydrocarbons. In this arrangement, the end of the rocker arm moving toward the valve cover when the exhaust valve is opened collapses one pump chamber to supply a charge of air to the exhaust passage. This charge of air oxidizes the hydrocarbons in the initial portion of the exhaust gases. As the valve closes near the end of the exhaust stroke, the other end of the rocker arm collapses the other chamber to supply a second charge of air to the exhaust passage. The second charge of air oxidizes the hydrocarbons in the final portion of the exhaust gases.

The amount of air supplied by each chamber is adjusted according to engine needs by varying the diaphragm means stroke length or the pump chamber area. Other timing patterns can be provided by also associating pump means with the intake valve if desired. Multicylinder engines can have pump chambers associated with each cylinder and can direct air from a pump chamber of one cylinder to the exhaust passages of another cylinder.

Figure 3:
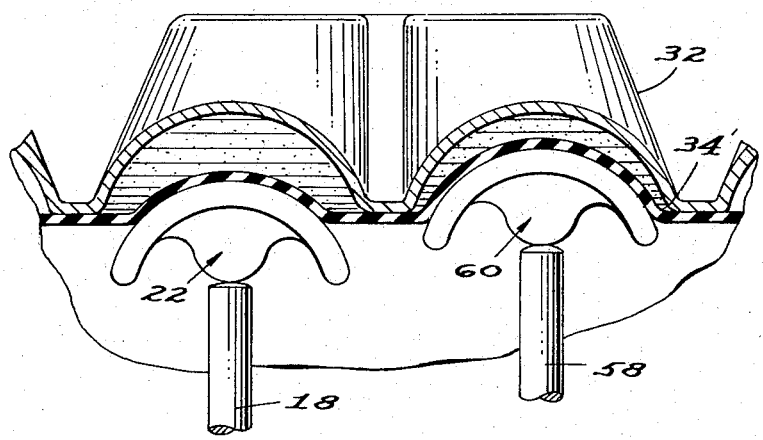

FIGURE 1 of the drawings illustrates graphically the changes in the concentration of unburned hydrocarbons in exhaust gases with the exhaust valve position for a typical engine under normal operating conditions;

FIGURE 2 is a cross-sectional end view of the upper portion of an internal combustion engine of this invention; and FIGURE 3 is a cross-sectional side view of a portion of an engine of this invention showing pump means associated with both the intake valve and the exhaust valve.

As FIGURE 1 shows, the initial and final portions of the exhaust gases usually contain a high proportion of unburned hydrocarbons. The initial portion usually is at a temperature well above the spontaneous ignition temperature of the hydrocarbons and the carbon monoxide, and mixing air with this portion oxidizes the hydrocarbons, thereby producing heat which aids in keeping the temperature of subsequently exhausting gases above the spontaneous ignition temperature. Air supplied near the end of the exhaust operation oxidizes the high proportion of hydrocarbons in the final portion of exhausting gases.

The engine shown in FIGURE 2 comprises an engine block 10 having a cylinder bore 11 which contains a piston 12. An engine head member 14 is mounted on block 10 to define a combustion chamber 16. Mounted in head member 14 is exhaust valve 18 opening combustion chamber 16 to an exhaust passage 20. A valve spring means 19 is mounted coaxially with valve 18 between head member 14 and retainer means 21. Exhaust valve 18 is operably contacted by valve end 22b of rocker arm 22. Rocker arm 22 is of the individual fulcrum type pivoting about fulcrum 24 which is mounted on fulcrum stud 26 and held in place by threaded fastener 28. Pushrod end 22a of rocker arm 22 is operably contacted by a pushrod 30.

Mounted on top of head member 14 is valve cover 32. A flexible diaphragm 34 is bonded to cover 32 to form separate pump chambers 36 and 38 adjacent rocker arm ends 22a and 22b. Spring means 56 mounted within each chamber 36 and 38 between cover 32 and sections 34a and 34b of diaphragm 34 maintain engagement of sections 34a and 34b with ends 22a and 22b, respectively. Between chambers 36 and 38, a depression 39 in the inner surface of cover 32 cooperates with diaphragm 34 to form a fluid reservoir 40.

Diaphragm 34 has flaps 41 and 43 which, together with valve cover 32, form flap valves 42 and 44 providing outlet means from chambers 36 and 38, respectively, to reservoir 40. Check valves 46 and 48 are mounted in cover 32 to provide inlet means to chambers 36 and 38, respectively. Check valves 46 and 48 are the well known one way type.

Cover 32 is held in place by a bolt 50 that passes through reservoir 40 and threadably engages the cylinder head member 14. A bore 52 cut through bolt 50 communicates with a bore 54 in head member 14 which communicates with exhaust passage 20.

During the engine exhaust stroke, upward motion of pushrod 30 imparted by a conventional rotating camshaft pivots rocker arm 22 to open valve 18, thereby allowing gases to exhaust from combustion chamber 16 into exhaust passage 20. Valve spring means 19 returns valve 18 to its closed position when the lift imparted by the camshaft to pushrod 30 is removed. Thus, pushrod 30, valve 18 and rocker arm ends 22a and 22b have reciprocating motion while rocker arm 22 has rocking motion.

The reciprocating motion of ends 22a and 22b of rocker arm 22 is transmitted to sections 34a and 34b of diaphragm 34. When pushrod 30, rocker arm end 22a and diaphragm section 34a move away from cover 32, air is drawn into chamber 36 through check valve 46. Simultaneously, rocker arm end 22b and diaphragm section 34b move toward cover 32 to pump air out of chamber 38 via flap valve 44 into reservoir 40 and through bores 52 and 54 to exhaust passage 20. Subsequent movement of pushrod 30, rocker arm end 22a and diaphragm section 34a toward cover 32 pumps air out of chamber 36 via flap valve 42 into reservoir 40 and then into exhaust passage 20 while movement of valve end 22b and section 34b away from cover 32 draws air into chamber 38 through check valve 48.

Chamber 36 supplies a charge of air to exhaust passage 20 as exhaust valve 18 is opening to oxidize the initial portion of unburned hydrocarbons in the exhaust gases emerging from combustion chamber 16. Chamber 38 supplies a charge of air to passage 20 as exhaust valve 18 is closing to oxidize the final portion of unburned hydrocarbons in the exhaust gases.

In the engine construction comprising a pump means associated with both the exhaust valve 18 and the intake valve 58 shown in FIGURE 3, diaphragm 34' cooperates with cover 32 to form additional pump chambers adjacent intake valve rocker arm 60. Details of construction and operation of the FIGURE 3 engine are substantially similar to the FIGURE 2 engine described above and therefore are not repeated.

What is claimed is:
1. An internal combustion engine which comprises
    a combustion chamber valve mounted in an engine head member,
    rocker arm means imparting operating motion to said valve,
    cover means mounted on said head member,
    diaphragm means forming pump chambers with said cover means adjacent each end of the rocker arm means, said diaphragm means having reciprocating motion imparted thereto by said rocker arm means,
    inlet means to each pump chamber and
    outlet means from each pump chamber.
2. The engine of claim 1 in which each outlet means comprises flap valve means opening into a reservoir located between said pump chambers.
3. The engine of claim 2 in which each inlet means comprises a check valve mounted in the cover means.
4. The engine of claim 3 which comprises reservoir outlet means connecting the reservoir with the combustion chamber exhaust passage.
5. The engine of claim 4 in which each check valve is open to the atmosphere and each pump chamber pumps air from the atmosphere to the combustion chamber exhaust passage.
6. The engine of claim 5 in which the reservoir outlet means comprises a fastener holding the cover means on the engine head member, said fastener having a bore therein communicating with the reservoir.
7. The engine of claim 6 in which the head member has a bore therein communicating wtih the combustion chamber exhaust passage and the bore in the fastener.
8. The engine of claim 7 in which the reservoir is formed by the diaphragm means and the cover means.
9. The engine of claim 1 in which the inlet means communicates with the atmosphere and the outlet means communicates with the combustion chamber exhaust passage.
10. The engine of claim 1 in which the outlet means comprises a fastener holding the cover means on the engine head member, said fastener having a bore therein communicating with the combustion chamber exhaust passage.

References Cited
UNITED STATES PATENTS

| | | | |
|---|---|---|---|
| 2,955,582 | 10/1960 | Taylor | 123—119 |
| 3,065,595 | 11/1962 | Gary | 60—30 |
| 3,147,588 | 9/1964 | Tauschek | 60—30 |

RALPH D. BLAKESLEE, *Primary Examiner.*